United States Patent [19]

Glang et al.

[11] Patent Number: 5,648,036

[45] Date of Patent: Jul. 15, 1997

[54] DEVICE AND PROCESS FOR PRODUCING THE CORNERS OF SEALING FRAMES

[75] Inventors: Siegfried Glang, Hamburg; Werner Grabe, Winsen; Holger Gutschmidt, Neu Wulmstorf; Jurgen Ludemann, Hamburg, all of Germany

[73] Assignee: Phoenix Aktiengesellschaft, Hamburg, Germany

[21] Appl. No.: 532,864

[22] Filed: Sep. 22, 1995

Related U.S. Application Data

[63] Continuation of Ser. No. 87,738, Jul. 13, 1993, abandoned, and PCT/DE93/00063, Jan. 26, 1993, published as WO93/14917, Aug. 5, 1993.

[30] Foreign Application Priority Data

Jan. 28, 1992 [DE] Germany ............... 42 02 225.8

[51] Int. Cl.$^6$ ............... B29C 45/14; B29C 33/00; B29C 65/70

[52] U.S. Cl. ............... 264/261; 264/264; 264/328.1; 425/111; 425/123; 425/127

[58] Field of Search ............... 264/261, 263, 264/264, 328.1; 425/123, 111, 116, 127, 190, 192 R, 195

[56] References Cited

U.S. PATENT DOCUMENTS

| | | | |
|---|---|---|---|
| 4,352,772 | 10/1982 | Bezner | 425/123 |
| 4,824,289 | 4/1989 | Glang et al. | |
| 4,964,620 | 10/1990 | Omura et al. | 264/261 |
| 5,069,849 | 12/1991 | Wain. | |
| 5,127,193 | 7/1992 | Okada et al. | 264/261 |
| 5,256,361 | 10/1993 | Keys | 264/261 |
| 5,258,157 | 11/1993 | Nozaki et al. | 264/261 |

FOREIGN PATENT DOCUMENTS

| | | |
|---|---|---|
| 255600 | 6/1987 | European Pat. Off. . |
| 427383 | 5/1991 | European Pat. Off. . |
| 1004041 | 12/1949 | France . |
| 1431460 | 4/1976 | United Kingdom . |

*Primary Examiner*—Jill L. Heitbrink
*Attorney, Agent, or Firm*—Collard & Roe, P.C.

[57] ABSTRACT

Device consisting of an inner mold (15), an outer mold and at least one injection aperture arranged in the outer mold; for the manufacture of the corners of sealing frames, in particular tunnel sealing frames consisting in most cases of four assembled strand-shaped sealing profiles made of elastomeric material, whereby each sealing profile has open and/or closed grooves extending in the longitudinal direction and arranged on the profile base side, as well as additional ducts also extending in the longitudinal direction and disposed between the grooves and the profile back surface; whereby the manufacture of the corners of the sealing frames takes place according to the injection molding process. The essence of the invention lies in that the inner mold (15), viewed from the corner (16), is provided on both sides (17, 18) with additional mold inserts (24) as stops for the sealing profiles, whereby the mold inserts have bridges (25, 26) and pins (27, 28, 29) extending in the opposite direction to the corner (16) of the inner mold and, during the manufacture of the frame corners, close on the profile face all or at least part of the ducts. Introduced are another process variation as well as corresponding processes.

12 Claims, 4 Drawing Sheets

DEVICE AND PROCESS FOR PRODUCING THE CORNERS OF SEALING FRAMES

This is a continuation of application Ser. No. 08/087,738 filed on Jul. 13, 1993 now abandoned. International Application PCT/DE93/00063 filed on Jan. 26, 1993, published as WO93/14917 Aug. 5, 1993 and which designated the U.S.

BACKGROUND OF THE INVENTION

1. Field of the Invention

The invention relates to a device consisting of an inner mold, an outer mold, and at least one injection aperture arranged in the outer mold and leading into the mold gap particularly within the corner of the outer mold, for the manufacture of the corners of sealing frames.

2. The Prior Art

Tunnel sealing frames which, in most cases, consist of four assembled, strand-shaped sealing profiles are shown in (DE-C-28 33 345; GB-B-2 170 561; GB-B-2 178 114; GB-B-2 182 987; EP-B-0 255 600; EP-B-0 306 796; EP-A-0 368 174; EP-B-0 414 137; EP-A-0 441 250), whereby each sealing profile has open and/or closed grooves extending in the longitudinal direction and arranged on the base side of the profile, as well as additional ducts and also extending in the longitudinal direction, said ducts being disposed between the grooves and the back surface of the profile, whereby the manufacture of the sealing frames takes place according to the injection molding process (GB-2 178 114).

In the manufacture of the corners of sealing frames according to the injection molding process, the ducts of the strand-shaped sealing profiles, which are cut to size, were plugged up on both sides (end faces). In this way, penetration of the injection mass (nozzle-injected mass) of vulcanizable rubber into the profile ducts was prevented. However, heretofore, technical problems were connected with the handling of the rubber plugs. Furthermore, the manufacture of the frame was cost-intensive because of the non-reusability of the rubber plugs.

SUMMARY OF THE INVENTION

It is an object of the invention is to make available a plug-free manufacture of sealing frames, in particular for tunnel segments. The above object is achieved by a device comprising an inner mold (15), an outer mold and at least one injection aperture arranged in the outer mold; for the manufacture of the corners of sealing frames, in particular tunnel sealing frames including in most cases four assembled strand-shaped sealing profiles made of elastomeric material, whereby each sealing profile has open and/or closed grooves extending in the longitudinal direction and arranged on the profile base side, as well as additional ducts also extending in the longitudinal direction and disposed between the grooves and the profile back surface; whereby the manufacture of the corners of the sealing frames takes place according to an injection molding process. In a preferred embodiment, the inner mold (15), viewed from the corner (16), is provided on both sides (17, 18) with additional mold inserts (24) as stops for the sealing profiles, whereby the mold inserts have bridges (25, 26) and pins (27, 28, 29) extending in the opposite direction to the corner (16) of the inner mold and, during the manufacture of the frame corners, close on the profile face all or at least part of the ducts.

BRIEF DESCRIPTION OF THE DRAWINGS

The invention is explained in greater detail hereinafter by reference to schematic drawings, in which.

DETAILED DESCRIPTION OF PREFERRED EMBODIMENTS

Figure 1:
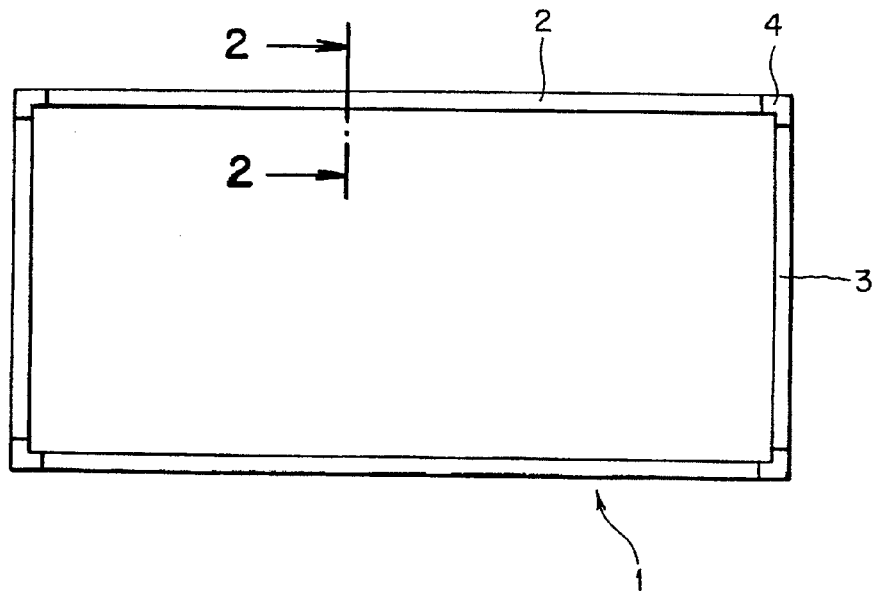
FIG. 1 shows a sealing frame.

FIG. 1 shows a sealing frame (1) consisting of four assembled, strand-shaped sealing profiles (2, 3) made of elastomeric material, i.e. of rubber or rubber-like material, whereby the corners (4) of said sealing frame are manufactured according to the injection molding process.

Figure 2:
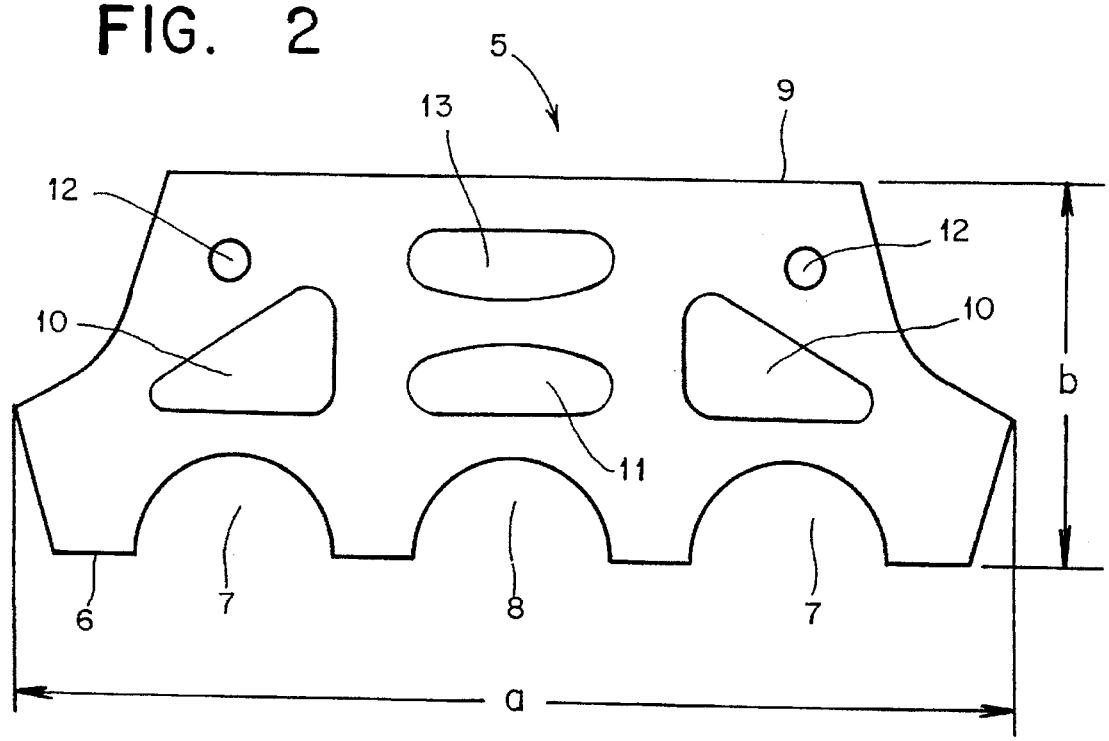
FIG. 2 shows a sealing profile viewed in cross section (section line A-B, FIG. 1)

FIG. 2 shows the cross section of a sealing profile (5) along the cut line A-B according to FIG. 1. In this connection, three open grooves (7, 8) extending in the longitudinal direction are present on the base surface (6). Six additional ducts (10, 11, 12, 13) also extending in the longitudinal direction are present between said grooves and the back surface (9) of the profile, said ducts being arranged in two rows and disposed directly (i.e., without displacement) above the three grooves. The ducts have, to some extent, different cross-sectional areas or diameters. With a profile width a of about 32 mm and a profile height b of about 12 mm, which, in tunnel construction, are the usual profile dimensions in the unstressed condition, the three ducts (10, 11) arranged directly above the grooves (7, 8) and having a trapezoidal or oval-shaped cross sectional configuration, as well as the center duct (13) of the row facing the profile base surface (9), which duct has an oval shape, viewed cross sectionally, each have an average diameter of >2 mm, whereas the two outer ducts (12), which are circular, viewed cross sectionally, have a diameter of <2 mm.

Figure 3:
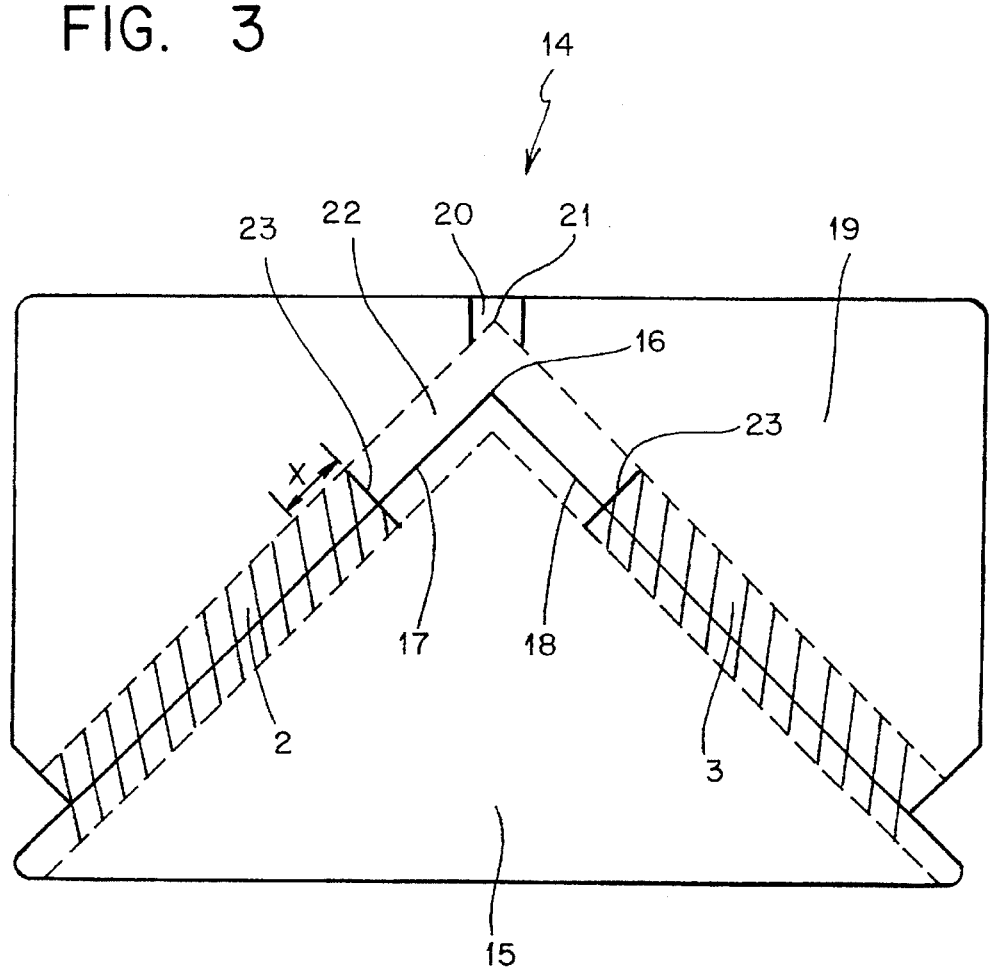
FIG. 3 shows the basic equipment of the device.

According to FIG. 3, the device (14) consists of the inner mold (15) with the corner (16) and the two sides (17, 18), as well as the outer mold (19), whereby the outer mold has an injection aperture (20) feeding within the corner (21) of said outer mold into the mold gap (22). Two strand-shaped sealing profiles (2, 3) or (5—FIG. 2) are present between the inner mold (15) and the outer mold (19) in corresponding mold recesses (dashed lines), which sealing profiles are now joined with each other via the frame corner (4—FIG. 1), which is also referred to as the injection corner. Now, it is important in this connection that all or at least a part of the ducts (10, 11, 12, 13—FIG. 2) are sealed during the injection molding process directly on the face (23) of the profile, or within the end zone X of the profile. For this, two device variations are proposed according to the invention.

Device Variation I

Figure 4:
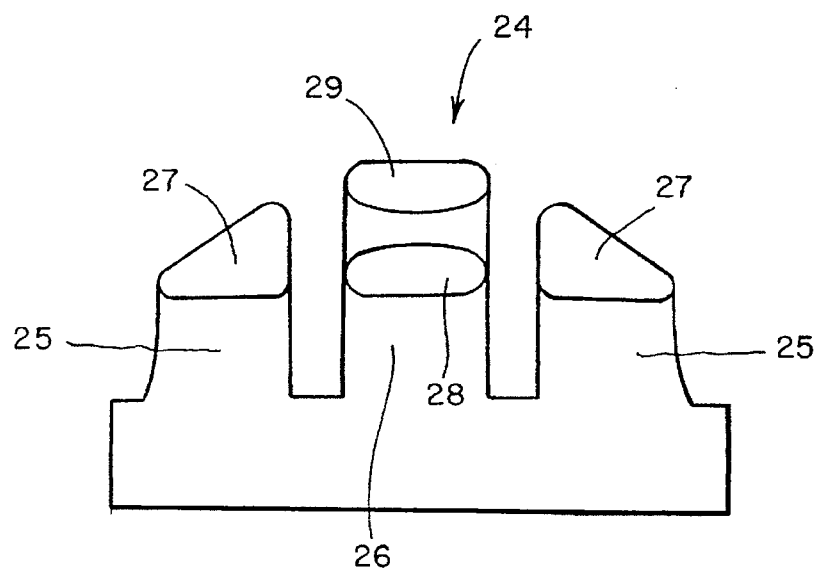
FIG. 4 shows a mold insert with bridges and pins.

Now, FIG. 4 shows a mold insert (24) having the three bridges (25, 26) as well as the four pins (27, 28, 29). The cross sectional shape of the pins, which usefully have a conical form and a length of 3 to 5 mm, is adapted to the four ducts (10, 11, 13—FIG. 2). Additional pins for the two outer ducts (12—FIG. 2) with a small cross section are not present in this case and not necessarily required.

Figure 5:
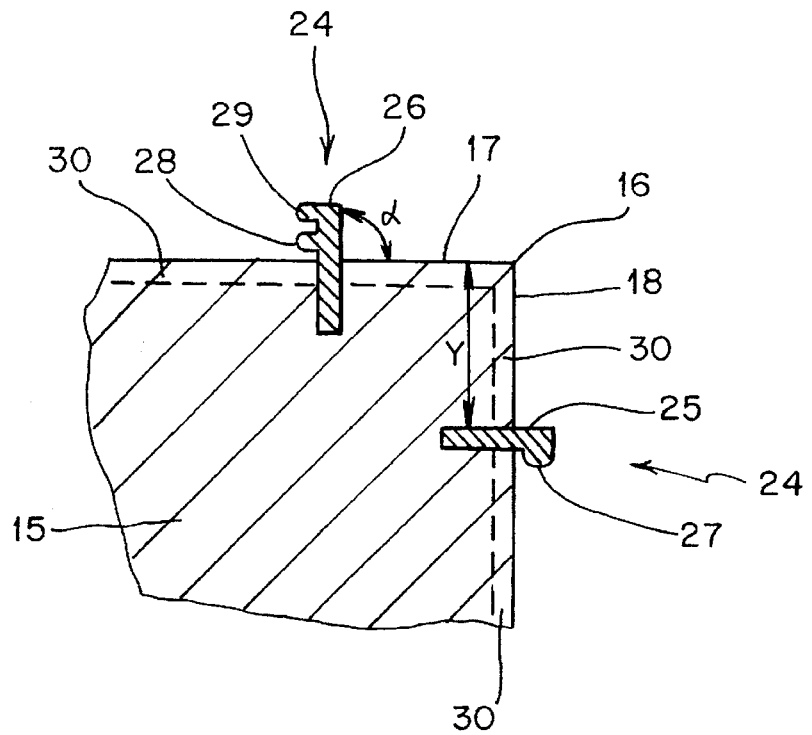
FIG. 5 shows the inner mold with a mold insert according to FIG. 4.

Now, according to FIG. 5, the inner mold (15), viewed from the corner (16), is provided on both sides with additional mold inserts (24). For the sake of better understanding, the inner bridge (26) with the pins (28, 29) is shown here within the mold side (17), whereas the mold side (18) shows the two outer bridges (25) with the pins (27).

All pins extend in the direction opposite to the corner (16), whereby the mold inserts (24) usefully have a minimum spacing Y of 20 mm from said corner. Furthermore, the bridges (25, 26) usefully have an angle alpha of 45° to 90°, namely based on the side (17, 18) of the inner mold (15), whereby with an angle alpha of <90°, the direction of expanse extends to the corner (16) of the inner mold.

Two strand-shaped sealing profiles (2, 3—FIG. 1; 5—FIG. 2) are inserted in the mold recess (30) extending across the corner (16) of the inner mold (15) and having a groove structure adapted to the base surface (6—FIG. 2) of the sealing profile; and, in doing so, are mounted until the pins (27, 28, 29) close on the profile face (23—FIG. 3) the four ducts (10, 11, 13—FIG. 2). Thus the mold inserts (24) have here the meaning of stops. Subsequently, the outer form (19—FIG. 3) is mounted. The rubber mixture is injected or admitted by nozzle into the remaining mold gap (22—FIG. 3) via the injection aperture (20). The frame corner is now vulcanized by means of heatable molding presses (not shown here). Subsequently, the device is opened and the corner is removed from the mold.

Figure 6:
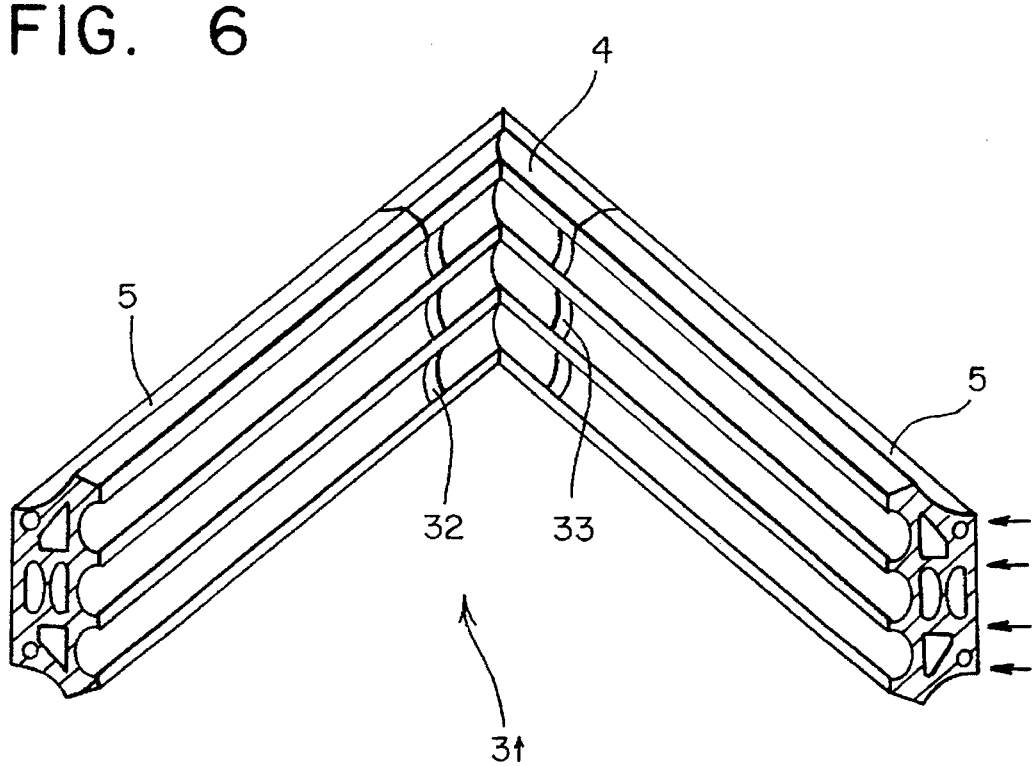
FIG. 6 shows a frame corner upon removal from the mold.

Now, FIG. 6 shows the inner side (31) of the finished frame or injection corner (4) with the adjacent sealing profiles (5). Said figures shows that following removal from the mold, apertures (32, 33) remain within the corner zone, which apertures were formed by the bridges (25, 26) of the mold insert (24—FIGS. 4, 5). Since said apertures are within the grooves (7, 8), they have no adverse bearing on the tightness because the linear zones (arrow direction) are decisive for the tightness of the elastomer profile.

Device Variation II

Figure 7:
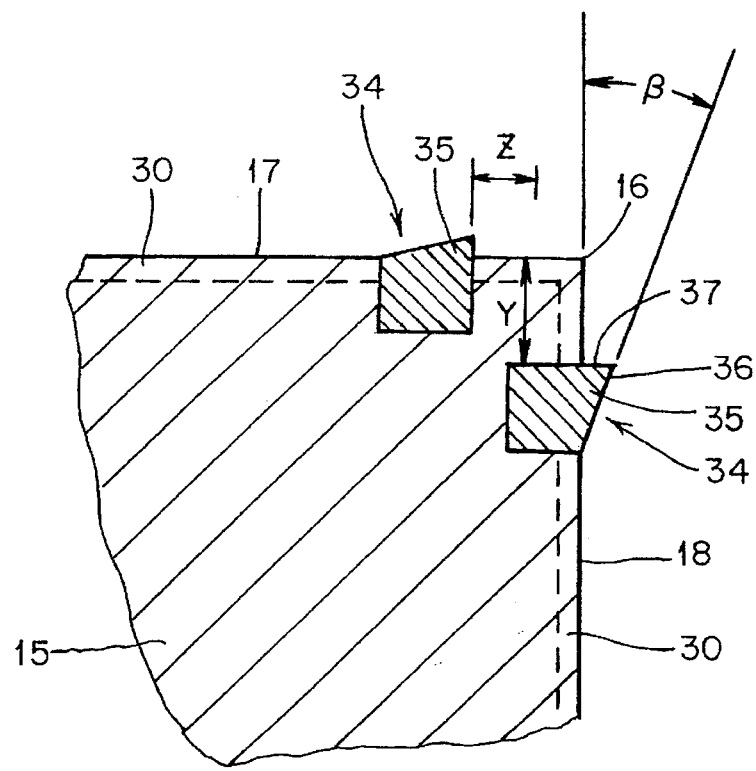
FIG. 7 shows the inner mold with a mold insert having barbs.
Figure 8:
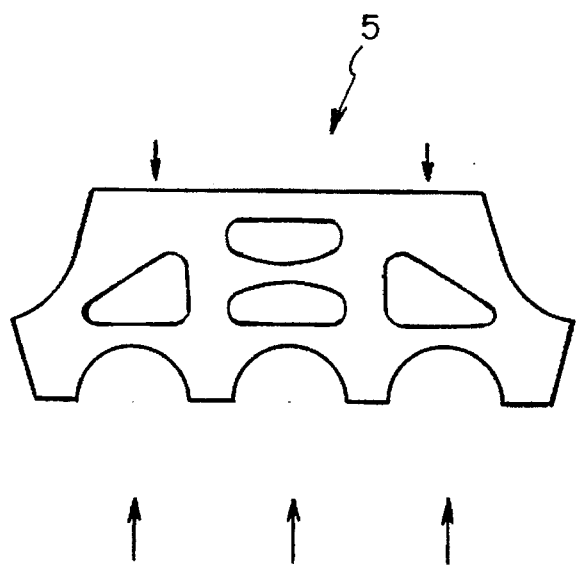
FIG. 8 shows a cross-section view of the sealing profile along line A-B of FIG. 1.

According to FIG. 7, the inner mold (15), viewed from the corner (16), has additional mold inserts (34) on both sides (17, 18) as well, which here, in accordance with the number of grooves of the sealing profile (5—FIGS. 2, 8), in each case have three barbs (35), which are usefully designed as ramps that ascend toward the corner (16) of the inner mold (15), whereby the angle beta of said ramp-like barbs amounts to 5° to 30°, in particular to 10° to 20°, namely based on the side (17, 18) of the inner mold (15). Within the zone of their highest elevation (based on side 17, 18), said ramp-like barbs may end parallel (plane 36) with the side (17, 18), if need be. The minimum spacing Y of the mold inserts comes here to 20 mm as well.

Now, as in connection with the device variation I, the two strand-shaped sealing profiles are inserted in the mold recess (30). However, the profiles are mounted here on the inner mold (15) to such an extent that the profile face (23—FIG. 3) comes to rest at least aligned with the side (37) of the barb (35) facing the corner (16) of the inner mold, in particular with an overhang Z of up to 5 mm. Subsequently, the outer mold is mounted, whereby in the profile end zone X (FIG. 3), all or at least a part of the ducts—here in particular the ducts (10, 11, 13—FIGS. 2, 8)—are closed by pressing (under action of pressure). With respect to the further process steps, reference is made to the description of process variation I.

The mode of operation of the barbs (35—FIG. 7) is now described on the basis of FIG. 8, which shows again the cross section of the sealing profile (5). During the injection molding process, the three barbs in connection with the outer mold (19—FIG. 3) press the ducts together under the action of pressure (arrow direction).

As shown on the exemplified embodiment (FIGS. 2, 6, 8), the grooves are open in most cases. With an application of sealing profiles where the grooves are completely or partly closed, the device variation I is preferably used in the manufacture of the frame corners. The closed grooves are then closed as the ducts during the injection molding process by means of corresponding additional pins, in particular if the average diameter amounts to $\geq 2$ mm.

We claim:

1. Process for the manufacture of the corners of tunnel sealing frames, using a device, comprising the following process steps:

mounting sealing profiles on an inner mold in said device until pins on bridges on said inner mold close all or at least a part of ducts in said profile;

mounting an outer mold in said device for closing of the device, and for creating a mold gap between said inner mold and said outer mold;

introducing a vulcanizable rubber mixture into said mold gap between the inner mold and outer mold via an injection aperture in the outer mold to produce a frame corner;

vulcanizing the frame corner by means of heatable molding presses; and opening the device.

2. Process for the manufacture of the corners of tunnel sealing frames, using a device, comprising the following process steps:

mounting sealing profiles on an inner mold in said device to such an extent that a barb on said inner mold comes to rest at a face of said profiles at least aligned with a side of said barb facing a corner of the inner mold;

said profile having an end zone X and said profile containing ducts;

mounting an outer mold in said device for closing of the device, whereby in said profile end zone X, all or at least a part of ducts is closed by means of the barbs and the outer mold under pressure action, and for creating a mold gap between said inner mold and said outer mold;

introducing a rubber mixture into said mold gap via an injection aperture in the outer mold to produce a frame corner;

vulcanizing said frame corner by means of heatable molding presses; and opening the device.

3. Process according to claim 2, wherein said barb is at a spaced distance overhang Z from the corner of the inner mold; and wherein said overhang Z ranges up to 5 mm.

4. Device for the manufacture of the corners of tunnel sealing frames comprising:

an outer mold; said outer mold having a mold corner; and an inner mold having a corner and having sides spaced from said outer mold;

a mold gap being formed between the inner mold and the outer mold;

at least one injection aperture in the outer mold and leading into said mold gap within said mold corner of the outer mold;

sealing profiles within said mold gap being strand-shaped sealing profiles made of elastomeric materials, each sealing profile having a back surface adjacent said outer mold; each sealing profile having grooves extending in a longitudinal direction and arranged on a profile base side opposite said back surface, and having ducts also extending in the longitudinal direction and disposed between the grooves and said profile back surface;

said inner mold, viewed from the corner of the inner mold, has on both sides mold inserts having bridges and pins, said bridges extending from the side of the inner mold, said pins extending from said bridges in the opposite direction from the corner of the inner mold and, during the manufacture of the frame corners, close on a profile face all or at least a part of the ducts, as stops for the sealing profiles.

5. Device according to claim 4, wherein said mold inserts have a minimum spacing Y of 20 mm from the corner of the inner mold.

6. Device according to claim 4, wherein said pins are shaped conically.

7. Device according to claim 6, wherein the length of said pins is from 3 to 5 mm.

8. Device according to claim 6, wherein only the ducts having an average diameter of $\geq 2$ mm are closed by said pins.

9. Device according to claim 8, wherein the bridges have an angle alpha of 45° to 90°, based on said side of the inner mold, whereby with an angle alpha of <90°, the direction of expanse extends to the corner of the inner mold.

10. Device for the manufacture of the corners of tunnel sealing frames comprising an outer mold; said outer mold having a mold corner; and an inner mold having a corner and having sides spaced from said outer mold;

a mold gap being formed between the inner mold and the outer mold;

at least one injection aperture in the outer mold and leading into said mold gap within said mold corner of the outer mold;

sealing profiles within said mold gap being strand-shaped sealing profiles made of elastomeric material, each sealing profile having a back surface adjacent said outer mold; each sealing profile has grooves extending in a longitudinal direction and arranged on a profile base side opposite said back surface, and having ducts also extending in the longitudinal direction and disposed between the grooves and said profile back surface; each sealing profile having an end zone X adjacent to said outer mold corner;

said inner mold, viewed from the corner of the inner mold, has on both sides mold inserts having barbs which, during the manufacture of the frame corners, close within the profile end zone X all or at least a part of the ducts by pressing.

11. Device according to claim 10, wherein said barbs comprise ramps ascending to the corner of the inner mold, whereby the ramp barbs end parallel with the side of the inner mold.

12. Device according to claim 11, wherein the ramp barbs are sloped at an angle beta of 5° to 30° from the side of the inner mold.

* * * * *